US011023190B2

(12) United States Patent
Uchino (10) Patent No.: US 11,023,190 B2
(45) Date of Patent: Jun. 1, 2021

(54) IMAGE FORMING APPARATUS

(71) Applicant: KONICA MINOLTA, INC., Tokyo (JP)

(72) Inventor: Satoshi Uchino, Toyokawa (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 16/775,831

(22) Filed: Jan. 29, 2020

(65) Prior Publication Data

US 2020/0241820 A1 Jul. 30, 2020

(30) Foreign Application Priority Data

Jan. 30, 2019 (JP) .............................. JP2019-014115

(51) Int. Cl.
*G06F 3/12* (2006.01)
*G10L 15/22* (2006.01)

(52) U.S. Cl.
CPC .......... *G06F 3/1279* (2013.01); *G06F 3/1204* (2013.01); *G06F 3/126* (2013.01); *G10L 15/22* (2013.01); *G10L 2015/223* (2013.01)

(58) Field of Classification Search
CPC ...... G06F 3/1279; G06F 3/1204; G06F 3/126; G10L 15/22; G10L 2015/223
See application file for complete search history.

(56) References Cited

U.S. PATENT DOCUMENTS

| | | | | |
|---|---|---|---|---|
| 2005/0246604 A1* | 11/2005 | Fujimoto | ............ | G06F 11/0748 714/742 |
| 2010/0110489 A1* | 5/2010 | Kanda | ................ | H04N 1/00352 358/1.15 |
| 2016/0112602 A1* | 4/2016 | Kawai | ...................... | H04N 1/46 358/1.14 |

FOREIGN PATENT DOCUMENTS

JP 2017065090 A 4/2017

* cited by examiner

*Primary Examiner* — Moustapha Diaby
(74) *Attorney, Agent, or Firm* — Buchanan Ingersoll & Rooney PC (57) ABSTRACT

An image forming apparatus includes: a controller that controls the image forming apparatus; a memory that stores noise levels produced by a plurality of devices constituting the image forming apparatus during operation of the devices; and a microphone that accepts a speech instruction for the image forming apparatus. The controller accepts a job, detects a speech level from the speech accepted by the microphone, compares the detected speech level with a noise level that corresponds to the job to be executed in the image forming apparatus and that has been read from the memory, and controls, based on a result of the comparison, which one of a process of accepting the speech instruction and a process of executing the job in the image forming apparatus should be preferentially performed.

7 Claims, 8 Drawing Sheets

| DEVICE | NOISE LEVEL |
|---|---|
| ADF (AUTO DOCUMENT FEEDER) | 1 |
| IMAGE READER | 2 |
| ENGINE | 4 |
| FINISHER | 3 |

FIG.5

|  | IMAGE READER | ENGINE | FINISHER | ADF | TOTAL VALUE |
|---|---|---|---|---|---|
| COPY | 2 | 4 | 3 | 1 | 10 |
| FAX RECEPTION | 0 | 4 | 1 | 0 | 5 |
| PRINT | 0 | 4 | 3 | 0 | 7 |

| DEVICE | NOISE LEVEL | TIME PERIOD(s) |
|---|---|---|
| IMAGE READER | 2 | 1~5 |
| ENGINE | 4 | 2~8 |
| FINISHER | 3 | 7~10 |
| ADF (AUTO DOCUMENT FEEDER) | 1 | 0 |

FIG.8

IMAGE FORMING APPARATUS

The entire disclosure of Japanese Patent Application No. 2019-014115, filed on Jan. 30, 2019, is incorporated herein by reference in its entirety.

BACKGROUND

Technological Field

The present disclosure relates to an image forming apparatus capable of accepting a speech instruction.

Description of the Related Art

With recent developments in speech recognition techniques, there are a multitude of electronic devices operable based on accepted speech instructions. Speech recognition techniques have also been employed in an image forming apparatus. An image forming apparatus allows a user to perform, in addition to operating a panel, a voice-activated operation (hereinafter also referred to as speech operation), or an operation from another wirelessly or wiredly connected terminal. As a result of these operations, a job such as a printing process is executed in the image forming apparatus.

When a job is executed in an image forming apparatus, the image forming apparatus produces operating sound depending on the type of job executed, which may hinder speech operation. In particular, if a job operated from another terminal at a remote location is executed in an image forming apparatus while speech operation is performed on the image forming apparatus, the image forming apparatus produces operating sound associated with the job and therefore may not be able to appropriately accept the speech operation.

Japanese Laid-Open Patent Publication No. 2017-65090 describes a technique in which a person close to an image forming apparatus and affected the most by operating sound can readily reduce the operating sound of the image forming apparatus (see [Abstract]).

SUMMARY

In the technique described in Japanese Laid-Open Patent Publication No. 2017-65090, however, all jobs are executed in a silent mode regardless of whether or not the job produces operating sound that may hinder processing in speech operation. When even a job that does not hinder processing in speech operation is executed in the silent mode, processing efficiency of the image forming apparatus decreases. This is problematic because processing performed in the image forming apparatus is not optimized.

The present disclosure has been made in view of the circumstances, and has an object to provide an image forming apparatus that optimizes processing performed in the image forming apparatus when speech operation is accepted, thereby improving user convenience.

To achieve at least one of the abovementioned objects, according to an aspect of the present invention, an image forming apparatus reflecting one aspect of the present invention includes: a controller that controls the image forming apparatus; a memory that stores noise levels produced by a plurality of devices constituting the image forming apparatus during operation of the devices; and a microphone that accepts a speech instruction for the image forming apparatus. The controller accepts a job, detects a speech level from the speech accepted by the microphone, compares the detected speech level with a noise level that corresponds to the job to be executed in the image forming apparatus and that has been read from the memory, and controls, based on a result of the comparison, which one of a process of accepting the speech instruction and a process of executing the job in the image forming apparatus should be preferentially performed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Embodiments of a technical idea according to the present disclosure are now described with reference to the drawings. In the following description, the same components are designated by the same characters, and their names and functions are also identical. Therefore, description thereof will not be repeated.

First Embodiment

<A. Overall Configuration of Image Forming Apparatus 1>

Figure 1:
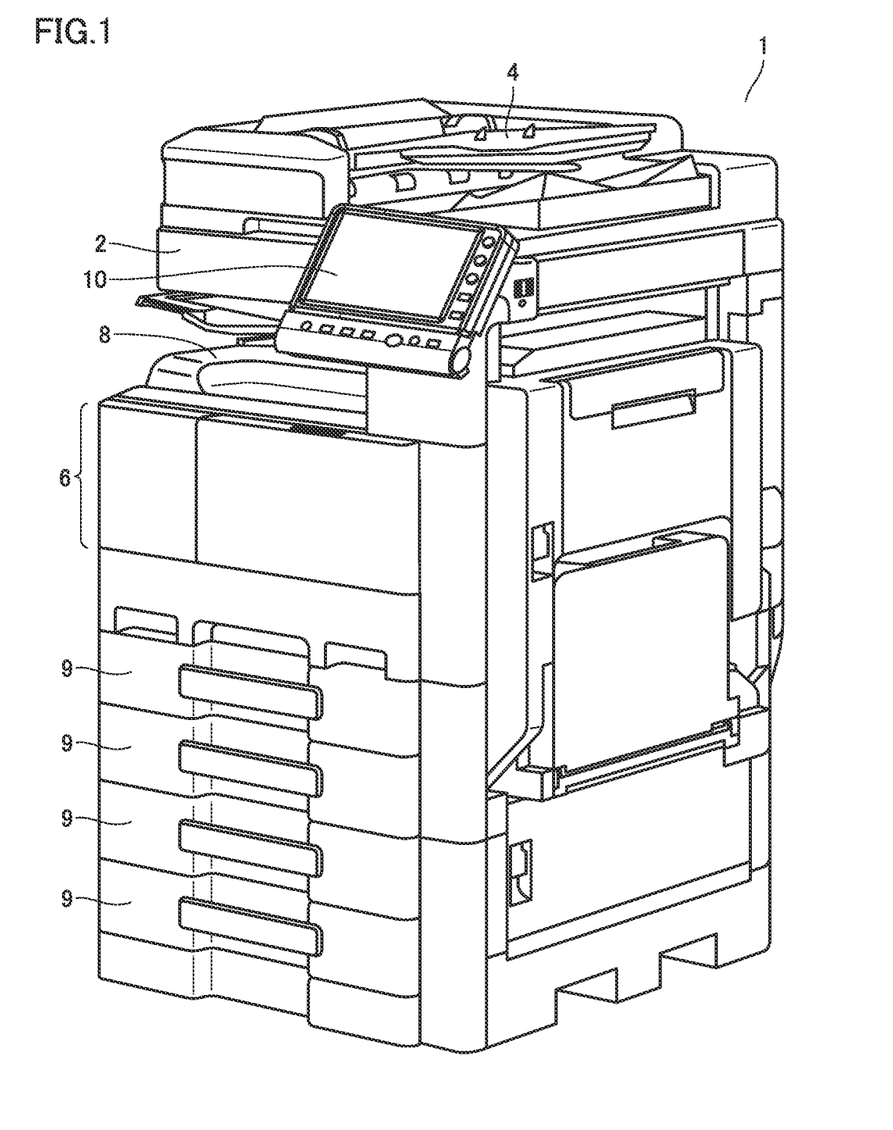
FIG. 1 shows an overall configuration of an image forming apparatus 1.

FIG. 1 shows an overall configuration of an image forming apparatus 1 according to a first embodiment. As a typical example of image forming apparatus 1, FIG. 1 illustrates a multi-function peripheral (M P) equipped with a plurality of functions such as a scanner function, a copy function, a facsimile function, a network function, and a BOX function.

Image forming apparatus 1 according to the present embodiment includes a scanner 2 for optically scanning a document to obtain image data, and a print engine 6 for printing an image on paper based on the image data. On an upper surface of a main body of image forming apparatus 1, a feeder 4 for feeding a document to scanner 2 is disposed, and in a lower portion of the main body, a plurality of paper feed units 9 for supplying paper to print engine 6 are disposed. In a central portion of image forming apparatus 1, a tray 8 where paper having an image formed thereon by print engine 6 is ejected is disposed.

An operation panel device 10 with a display surface is mounted on a front surface side (a surface to which a user is opposed) of the upper surface of the main body of image forming apparatus 1. Operation panel device 10 is a device for operating image forming apparatus 1.

A detailed structure according to the present embodiment is now described from various aspects with reference to the drawings.

<B. Hardware Configuration of Image Forming Apparatus>

Figure 2:
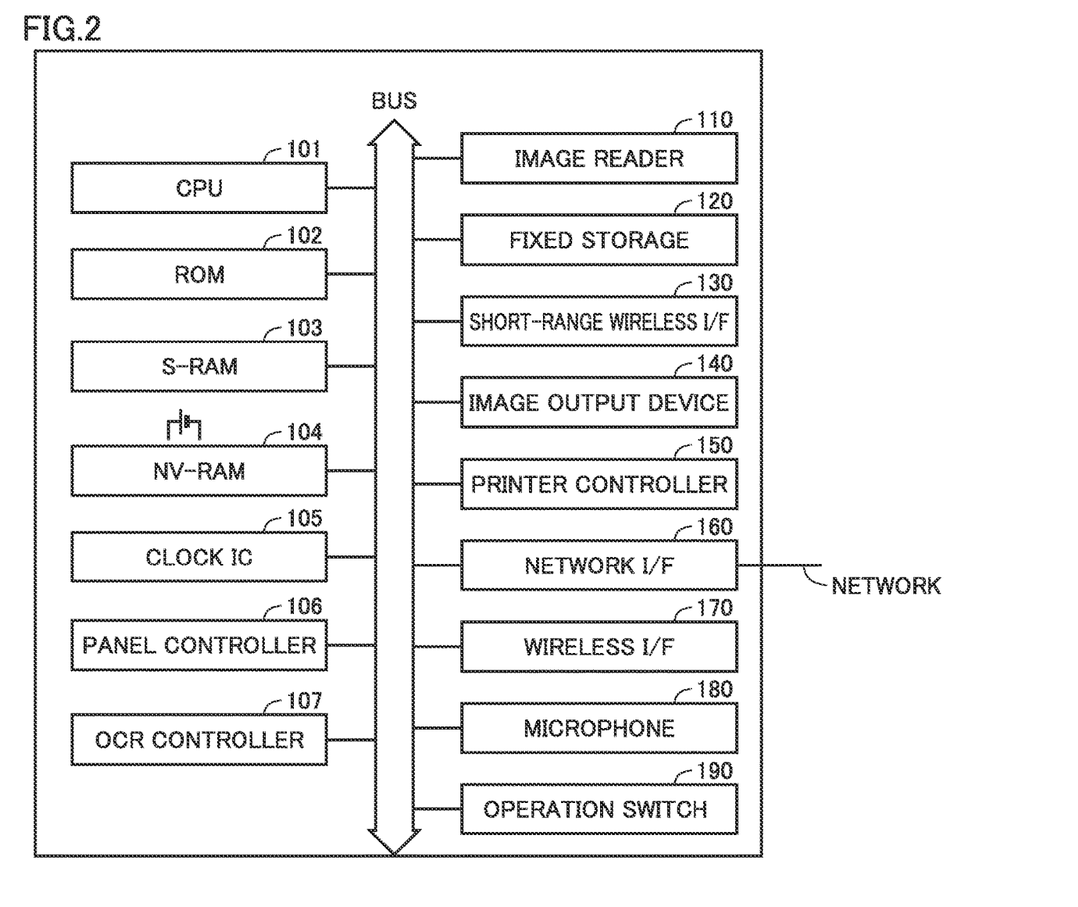
FIG. 2 is a block diagram showing a hardware configuration of the image forming apparatus.

FIG. 2 is a block diagram showing a hardware configuration of image forming apparatus 1. Referring to FIG. 2, image forming apparatus 1 includes a central processing unit (CPU) 101, a read only memory (ROM) 102 storing a control program, a static random access memory (S-RAM) 103 for work, a battery-backed-up non-volatile RAM (NV-RAM) 104 storing various settings regarding image formation, a clock integrated circuit (IC) 105, a panel controller 106, an optical character recognition (OCR) controller 107, an image reader 110, a fixed storage 120, a short-range wireless I/F 130, an image output device 140, a printer controller 150, a network I/F 160, a wireless I/F 170, a microphone 180, and an operation switch 190. Respective units 101 to 190 are connected to one another through a bus.

CPU 101 is responsible for overall control of the entire image forming apparatus 1 by executing an operation program stored in ROM 102 and the like. In particular, image forming apparatus 1 in the present embodiment can accept various operations by speech spoken by a user. Accordingly, the user's speech can be accepted by microphone 180, and a speech recognition process for recognizing the accepted speech as a command for various operations can be performed in CPU 101.

Additionally, in the present embodiment, in order to optimize processing when speech operation is accepted, image forming apparatus 1 performs a process of detecting a level of speech spoken by the user, and comparing this speech level with a noise level stored in ROM 102, as will be described later.

ROM 102 stores the program executed by CPU 101 and other types of data. In the present embodiment, a noise level produced by each of various types of devices in image forming apparatus 1 during operation of the device is stored in ROM 102 for each device.

S-RAM 103 serves as a work area while CPU 101 executes the program, and temporarily stores the program, data during the execution of the program, and the like.

NV-RAM 104 is a non-volatile memory backed up by a battery, and stores various settings regarding image formation and the like.

Clock IC 105 performs clocking, and functions as an internal timer for measurement of a processing time and the like. As will be described later, CPU 101 controls processing based on the time clocked by clock IC 105 in the present embodiment.

Panel controller 106 performs a rendering process on a display area of a touch panel, gesture recognition on the touch panel, and the like.

OCR controller 107 performs a character recognition process from image data obtained by image reader 110.

Image reader 110 includes a scanner and the like, and scans a document set on a platen glass and converts the scanned document into image data.

Fixed storage 120 is implemented by a hard disk and the like, and stores programs, various types of data and the like.

Short-range wireless I/F 130 conducts short-range wireless communication with another device.

Image output device 140 forms a copy image on paper.

Printer controller 150 generates a copy image from print data received by network I/F 160.

Network I/F 160 transmits and receives various types of information to and from external devices including a PC (not shown) and another image forming apparatus (not shown) connected thereto through a network. Image forming apparatus 1 in the present embodiment allows a person at a remote location other than a person performing speech operation to transmit a print job to image forming apparatus 1 from the PC through network I/F 160.

Wireless I/F 170 transmits and receives information to and from another device through a wireless signal.

Microphone 180 is a speech accepting means for accepting speech spoken by the user. The present embodiment is based on the assumption that the user provides an instruction to image forming apparatus 1 through microphone 180, and performs an operation based on this instruction.

Operation switch 190 is an input device to be pressed by the user, for example, to provide an instruction to image forming apparatus 1. Operation switch 190 may be a touch panel type input device displayed on operation panel device 10 shown in FIG. 1 and having a displayed switch to be pressed, or may be a switch having a physical contact provided on image forming apparatus 1, for example.

<C. Flow of Comparison Process>

Figure 3:
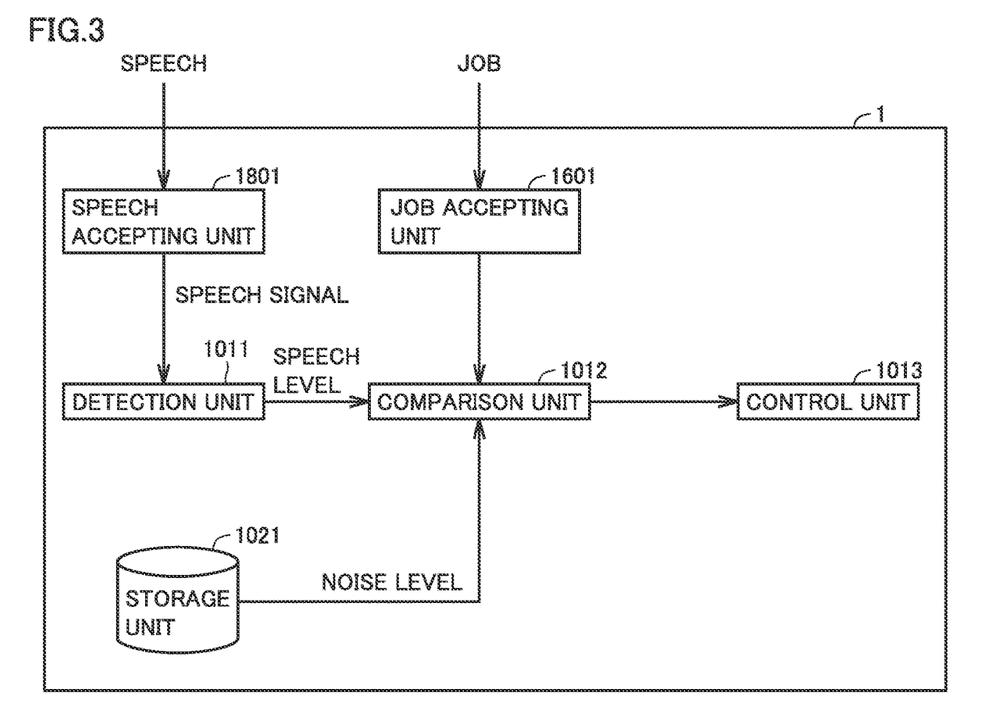
FIG. 3 is a block diagram showing a flow of a process of comparison with a noise level.

A description is now provided of a process of comparing a speech level and a noise level stored in ROM 102 that is performed in CPU 101, in order to optimize processing performed in image forming apparatus 1 when speech operation is accepted. FIG. 3 is a block diagram showing a flow of the process of comparison with a noise level. In order to perform the process of comparison with a noise level, image forming apparatus 1 has the functions of a detection unit 1011, a comparison unit 1012, a control unit 1013, a storage unit 1021, a job accepting unit 1601, and a speech accepting unit 1801.

Speech accepting unit 1801 shown in FIG. 3 accepts a speech instruction for image forming apparatus 1 from the user. In other words, speech accepting unit 1801 accepts speech spoken by the user by microphone 180 shown in FIG. 2, converts the speech into a speech signal, and recognizes the instruction for image forming apparatus 1 from this speech signal. Specifically, when the user says "copy," for example, speech accepting unit 1801 converts the spoken "copy" into a speech signal of "copy" by microphone 180, and recognizes an instruction to "copy" for image forming apparatus 1 from the speech signal of "copy." Image forming apparatus 1 employs a speech recognition technique of converting spoken words into a character string to cause a computer to recognize human speech.

Detection unit 1011 detects a speech level from the speech accepted by speech accepting unit 1801. In other words, when the converted speech signal at speech accepting unit 1801 is input, detection unit 1011 converts the speech signal into a volume level based on a predetermined reference, and detects this volume level as a speech level. The speech signal varies in sound amplitude (magnitude) depending on the content of an instruction spoken by the user. Accordingly, detection unit 1011 may perform the conversion into a volume level using a volume having a maximum sound amplitude in the speech spoken by the user as a reference, or using an average or modal volume of the speech spoken by the user as a reference. The reference for the conversion into a volume level at detection unit 1011 may be, for example, a volume required to perform a speech recognition process (input threshold). Of course, this reference may be freely set by the user depending on the environment in which image forming apparatus 1 is installed.

Job accepting unit 1601 shown in FIG. 3 accepts a job that is input to image forming apparatus 1. Job accepting unit 1601 can accept jobs from various types of input devices. For example, job accepting unit 1601 accepts a job from operation switch 190 displayed on operation panel device 10 shown in FIG. 1. Specific examples of the job accepted from operation switch 190 include a job of copying a document by the pressing of operation switch 190 by the user. Job accepting unit 1601 can also accept a job from a smartphone through wireless I/F 170. Specific examples of the job accepted through wireless I/F 170 include a job of printing a picture stored in the smartphone. Job accepting unit 1601 can also accept a job from a PC through network I/F 160. Specific examples of the job accepted through network I/F 160 include a job of transmitting a file in the PC as a facsimile to another telephone.

The "job" as used here refers to an instruction that is input to image forming apparatus 1, and a processing content in accordance with the instruction is executed in image forming apparatus 1. The specific content of a job varies with the content of an instruction that is input by the user. For example, when the user selects an A4 sheet of paper on operation panel device 10 and inputs a job of copying a document set on image reader 110 by pressing operation switch 190, this job includes a process of scanning the document by image reader 110, a process of forming an image of the document on the sheet of paper by print engine 6, and a process of ejecting the sheet of paper having the image formed thereon to tray 8. When the user inputs a job of printing a picture by operating a smartphone, this job includes a process of forming an image of the picture on a sheet of paper by print engine 6, and a process of ejecting the sheet of paper having the image formed thereon to tray 8. When the user inputs a job of transmitting a facsimile by operating a PC, this job includes a process of transmitting a facsimile to another telephone via a telephone line connected to image forming apparatus 1.

As a result of the acceptance of a job by job accepting unit 1601 and the execution of processing included in the job, the plurality of devices constituting image forming apparatus 1 operate and produce operating sound. In image forming apparatus 1 according to the present embodiment, a noise level produced by each operating device is prestored in storage unit 1021, instead of measuring operating sound of each operating device to determine a noise level each time.

Figure 4:
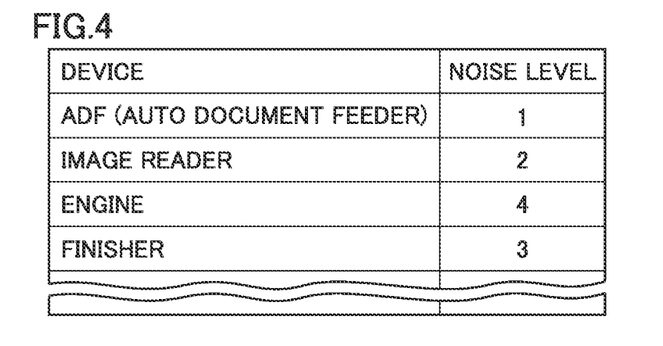
FIG. 4 schematically shows an example of a noise level for each device stored in a storage unit.

FIG. 4 schematically shows an example of a noise level for each device stored in storage unit 1021. FIG. 4 illustrates a noise level produced by each of the plurality of devices constituting image forming apparatus 1. Specifically, the noise level of an operating auto document feeder (ADF) which corresponds to feeder 4 shown in FIG. 1 is stored as "1", and the noise level of an operating image reader which corresponds to image reader 110 that scans an image is stored as "2", in storage unit 1021. The noise level of operating print engine 6 that forms an image on a sheet of paper is stored as "4", and the noise level of an operating finisher that ejects the sheet of paper having the image formed thereon is stored as "3", in storage unit 1021.

A noise level produced by a device is a volume level obtained by conversion of operating sound based on the same reference as that used for the conversion of a speech signal into a volume level. In comparison unit 1012, therefore, the speech level detected by detection unit 1011 can be directly compared with the noise levels stored in storage unit 1021. Each noise level may be set using a volume having a maximum sound amplitude in operating sound produced by the device as a reference, or an average or modal volume of operating sound produced by the device may be set as the noise level.

Comparison unit 1012 compares the speech level detected by detection unit 1011 with a noise level that corresponds to the job to be executed in image forming apparatus 1 and that has been read from storage unit 1021. In comparison unit 1012, the speech level detected by detection unit 1011 is compared not with a noise level produced by a device constituting image forming apparatus 1, but with a noise level produced by a job accepted by job accepting unit 1601. A noise level produced by a job is the sum total of noise levels of devices operating in processing performed by the job. Thus, comparison unit 1012 reads from storage unit 1021 the noise levels of a plurality of devices corresponding to a job, and sums the noise levels of the devices to determine a noise level produced by the job. A noise level produced by a job is a total value of a plurality of noise levels produced by a plurality of devices operated in the job executed based on a prescribed setting (such as a setting of paper feed speed to normal speed).

Figure 5:
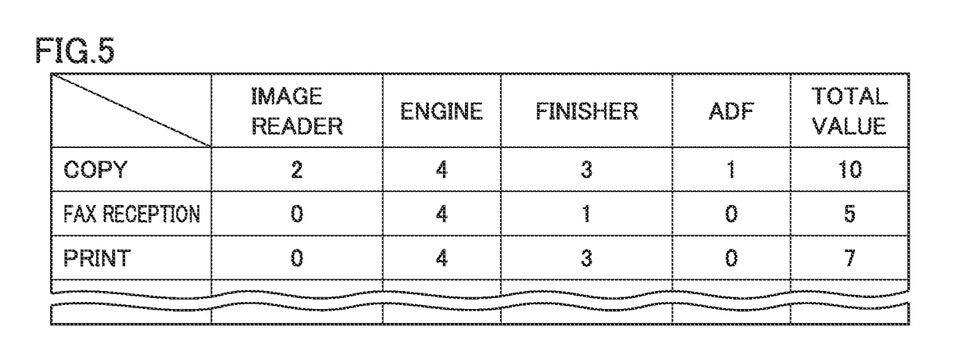
FIG. 5 shows a total value of noise levels calculated for each job by a comparison unit.

FIG. 5 shows a total value of noise levels calculated for each job by comparison unit 1012. For example, when executing a job of copying a document scanned by image reader 110 on an A4 sheet of paper, the noise level of "1" of the operating ADF because of the use of the ADF corresponding to feeder 4, the noise level of "2" of the operating the image reader for scanning the document, the noise level of "4" of the operating engine for forming an image of the document on the sheet of paper, and the noise level of "3" of the operating finisher for ejecting the sheet of paper having the image formed thereon are produced. Thus, a maximum volume is reached when the four types of devices, that is, the ADF, the image reader, the engine and the finisher operate simultaneously. Therefore, a noise level produced by the "copy" job is a total value of these noise levels, i.e., "10". Next, when executing a job of printing a file transmitted from a PC on a sheet of paper, the noise level of "4" of the operating engine for forming an image of the file on the sheet of paper, and the noise level of "3" of the operating finisher for ejecting the sheet of paper having the image formed thereon are produced. Thus, a maximum volume is reached when the two types of devices, that is, the engine and the finisher operate simultaneously. Therefore, a noise level produced by the "print" job is a total value of these noise levels, i.e., "7".

Based on information of a job accepted by job accepting unit 1601, comparison unit 1012 reads the noise levels produced by the devices shown in FIG. 4 from storage unit 1021. Further, based on the noise levels produced by the devices that have been read from storage unit 1021, comparison unit 1012 determines the noise level produced by the job as shown in FIG. 5.

Comparison unit 1012 also receives a level of the speech spoken by the user from detection unit 1011. Comparison unit 1012 compares the noise level produced by the job with the speech level, and outputs a result of the comparison to control unit 1013. When a newly accepted job by job accepting unit 1601 is executed while the user is performing speech operation, comparison unit 1012 determines whether or not a noise level produced by this job hinders acceptance of the speech operation. In comparison unit 1012, therefore, a maximum volume produced by a plurality of devices operating simultaneously by the newly accepted job by job accepting unit 1601 is set as the noise level produced by the job, and compared with the speech level. However, the plurality of devices do not necessarily operate simultaneously by the job. Therefore, comparison unit 1012 may set a noise level of a device producing a maximum volume of the plurality of operating devices as the noise level produced by the job, and compare the noise level with the speech level. Further, comparison unit 1012 may set an average value or a mode value of the noise levels of the operating devices as the noise level produced by the job, and compare the noise level with the speech level.

Based on a result of the comparison by comparison unit 1012, control unit 1013 controls which one of the process of accepting speech operation and the job process in image forming apparatus 1 should be preferentially performed. Specifically, when the comparison result shows that the noise level is higher than the speech level, control unit 1013 suspends the execution of the newly accepted job, or executes the accepted job in the silent mode (silent operation) so as to give higher priority to the acceptance of speech operation. When the job is executed in the silent mode, devices operated by the job operate at lower speed than in the normal mode. By executing the job in the silent mode, therefore, the noise level produced by the job can be reduced, and control of giving higher priority to the process of accepting speech operation is performed. Of course, when the comparison result shows that the noise level is higher than the speech level even after the job is executed in the silent mode, control unit 1013 suspends the execution of the newly accepted job so as to give higher priority to the acceptance of speech operation. Control unit 1013 performs control of switching the mode in which a job is executed from the normal mode to the silent mode. In other words, control unit 1013 includes a switching means (not shown) for switching the mode between the normal mode and the silent mode.

In contrast, when the comparison result shows that the noise level is lower than or equal to the speech level, the execution of the newly accepted job by job accepting unit 1601 does not hinder the acceptance of speech operation. Thus, control unit 1013 executes the job process in the normal mode in image forming apparatus 1.

Comparison unit 1012 has been described as comparing the speech level detected by detection unit 1011 with the noise level produced by the job. However, instead of detecting a speech level accepted through speech operation at detection unit 1011 each time, a speech level accepted through common speech operation (volume level "5", for example) may be set as a preference threshold value for giving higher priority to the acceptance of speech operation, and comparison unit 1012 may compare this preference threshold value with the noise level produced by the job. As a result, when comparison unit 1012 compares the speech level with the noise level produced by the job, the process of detecting a speech level at detection unit 1011 is no longer needed.

When a new job is accepted while speech operation is being accepted by speech accepting unit 1801, comparison unit 1012 calculates a noise level produced by this job, and compares this noise level with the preference threshold value. When the noise level is higher than the preference threshold value, control unit 1013 suspends the execution of the newly accepted job, or executes the accepted job in the silent mode. When comparison unit 1012 outputs a result of the comparison between the noise level of each device operating in the job and the preference threshold value, and the noise level of the device is higher than the preference threshold value, control unit 1013 executes the newly accepted job by suspending only the execution of a device producing a noise level higher than the preference threshold value, or by performing the execution in the silent mode. As a result, processing efficiency can be increased as compared to when the execution of the whole of the newly accepted job is suspended or the job is executed in the silent mode.

When comparison unit 1012 outputs a result of the comparison between the noise level of each device operating in the job and the speech level detected by detection unit 1011, and the noise level of the device is higher than the speech level, control unit 1013 may execute the newly accepted job by suspending only the execution of a device producing a noise level higher than the speech level, or by performing the execution in the silent mode.

<D. Overall Process Including Comparison Process>

Figure 6:
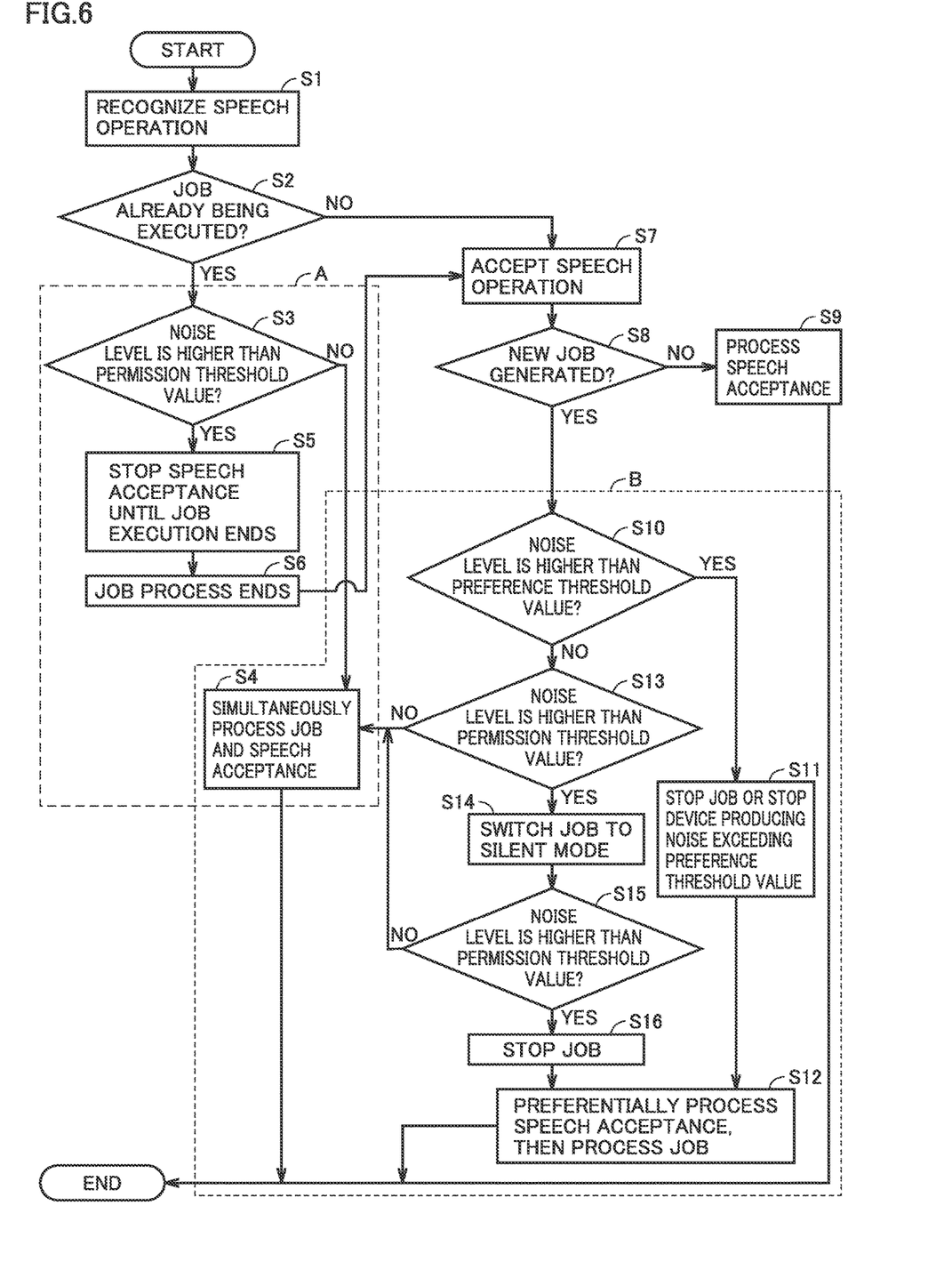
FIG. 6 is a flowchart showing an overall process.

Although the foregoing description has described an example where a new job is accepted while speech operation is already being accepted, speech operation may be accepted while a job is already being accepted. Thus, an overall process of accepting speech operation including before and after the job acceptance is described. FIG. 6 is a flowchart showing the overall process. Referring to FIG. 6, first, image forming apparatus 1 recognizes speech operation (step S1). Specifically, the user inputs an instruction to microphone 180 shown in FIG. 2 through speech operation. Then, image forming apparatus 1 determines whether or not a job is already being executed at the time of the input of the instruction by the user through speech operation (step S2). For example, when a job of printing a file on a sheet of paper is being transmitted to image forming apparatus 1 from a PC, image forming apparatus 1 determines that the job is already being executed. When the job is already being executed (YES in step S2), image forming apparatus 1 then performs a comparison process (step S3).

A region A enclosed by a broken line indicates processing contents where a job is executed first and speech operation is accepted thereafter in prior-and-subsequent relation between a job and speech operation. In step S3, a noise level produced by the job that has been calculated at comparison unit 1012 shown in FIG. 3 is compared with a predetermined threshold value based on which input of speech operation is permitted (hereinafter also referred to as permission threshold value). The permission threshold value as used here refers to a volume level that can be permitted as input of speech operation when image forming apparatus 1 accepts speech operation. In other words, the user needs to speak speech of a volume level higher than this permission threshold value when performing speech operation on image forming apparatus 1. Thus, comparison unit 1012 can determine that the speech operation is hindered if a noise level higher than the permission threshold value is produced by the job. The permission threshold value may be determined based on experiments where speech operation is actually performed amidst noise, or may be calculated based on an average value of a volume level of human speech.

When the noise level produced by the job being executed is lower than or equal to the permission threshold value (NO in step S3), image forming apparatus 1 determines that this job process does not affect the speech operation process, and simultaneously performs both processes (step S4) and ends the overall process. In contrast, when the noise level produced by the job being executed is higher than the permission threshold value (YES in step S3), image forming apparatus 1 determines that this job process affects the speech operation process, and stops accepting the speech operation until after this job process ends (step S5). After this job process ends (step S6), image forming apparatus 1 accepts the speech operation (step S7).

When there are no jobs and speech operation is accepted (NO in step S2), image forming apparatus 1 determines whether or not a new job has been generated during the acceptance of speech operation (step S8). When a new job has not been generated during the acceptance of speech operation (NO in step S8), image forming apparatus 1 processes the acceptance of speech operation (step S9) and ends the overall process. When a new job has been generated during the acceptance of speech operation (YES in step S8), image forming apparatus 1 then performs a comparison process (step S10). A region B enclosed by a broken line indicates processing contents where speech operation is accepted first and a job is accepted thereafter in prior-and-subsequent relation between a job and speech operation.

In step S10, a noise level produced by this newly accepted job is compared with a threshold value serving as a reference for giving higher priority to the acceptance of speech operation (hereinafter also referred to as preference threshold value). The noise level produced by this newly accepted job is calculated by comparison unit 1012 shown in FIG. 3. The preference threshold value is a volume level serving as a reference for determining whether or not to give higher priority to the acceptance of speech operation. This value may be determined based on experiments where speech operation is actually performed amidst noise, or may be calculated based on an average value of a volume level of human speech. When the noise level produced by this newly accepted job is higher than the preference threshold value (YES in step S10), image forming apparatus 1 performs a process of giving higher priority to the acceptance of speech operation (step S11). Specifically, image forming apparatus 1 suspends the execution of the newly accepted job. Image forming apparatus 1 also suspends the execution of only a device producing a noise level higher than the preference threshold value, preferably based on the table of FIG. 4 stored in storage unit 1021. Image forming apparatus 1 suspends the execution of the job in this manner, preferentially processes the acceptance of speech operation during the suspension, and starts processing this job after this process ends (step S12). The overall process ends after the processing of the job ends.

In contrast, when the noise level is lower than or equal to the preference threshold value (NO in step S10), image forming apparatus 1 further performs a comparison process (step S13). In this process, the noise level and the aforementioned permission threshold value are compared with each other in a manner similar to step S10. When the noise level is lower than or equal to the permission threshold value (NO in step S13), image forming apparatus 1 determines that this job process does not affect the speech operation process, and simultaneously performs both processes (step S4) and ends the overall process. In contrast, when the noise level is higher than the permission threshold value (YES in step S13), image forming apparatus 1 executes the accepted job in the silent mode (step S14). Devices operated by the job are operated in a reduced (slower) manner than in the normal mode, so that the noise level produced by the job can be reduced. Regarding relation between the preference threshold value and the permission threshold value, the preference threshold value is set to be higher than the permission threshold value. In other words, image forming apparatus 1 performs different processes depending on whether the noise level produced by the job is higher than the preference threshold value, or is lower than or equal to the preference threshold value and higher than the permission threshold value, or is lower than or equal to the permission threshold value.

Then, image forming apparatus 1 calculates, by comparison unit 1012, a noise level in the silent mode of the job executed after the switching to the silent mode, and compares the noise level with the permission threshold value again (step S15). The table of FIG. 4 illustrates the noise levels produced when the devices are driven in the normal mode as an example, whereas noise levels produced when the devices are driven in the silent mode are not shown but are stored in storage unit 1021. When the noise level is lower than or equal to the permission threshold value as a result of the execution in the silent mode (NO in step S15), image forming apparatus 1 simultaneously performs both processes (step S4) and ends the overall process. In contrast, when the noise level remains higher than the permission threshold value even after the switching to the silent mode (YES in step S15), image forming apparatus 1 stops the job so as to give higher priority to the acceptance of speech operation (step S16), then processes the job (step S12).

<E. Conclusion of This Section>

As described above, image forming apparatus 1 according to the first embodiment includes: job accepting unit 1601 to accept a job; speech accepting unit 1801 to accept a speech instruction for image forming apparatus 1; detection unit 1011 to detect a speech level from the speech accepted by speech accepting unit 1801; and storage unit 1021 storing the noise levels produced by the plurality of devices constituting image forming apparatus 1 during operation of the devices. Image forming apparatus 1 further includes: comparison unit 1012 to compare the speech level detected by detection unit 1011 with a noise level that corresponds to the job to be executed in image forming apparatus 1 and that has been read from storage unit 1021; and control unit 1013 to control, based on a result of the comparison by comparison unit 1012, which one of a process of accepting the speech instruction and a process of executing the job in image forming apparatus 1 should be preferentially performed. Accordingly, image forming apparatus 1 according to the first embodiment can compare the detected speech level with the noise level that corresponds to the job and that has been read from storage unit 1021, and control which one of a process of accepting the speech instruction and a process of executing the job in image forming apparatus 1 should be preferentially performed, to optimize processing performed in image forming apparatus 1 when speech operation is accepted, thereby improving user convenience.

Additionally, comparison unit 1012 of image forming apparatus 1 according to the first embodiment can calculate a total value of the plurality of noise levels produced by the plurality of devices operated in a job executed based on a prescribed setting, and comparison unit 1012 may compare the speech level detected by detection unit 1011 with this total value calculated by comparison unit 1012. Accordingly, comparison unit 1012 of image forming apparatus 1 according to the first embodiment can readily calculate a maximum volume of a noise level produced by the job by calculating this total value of the noise levels, and use it for comparison, thereby optimizing processing performed in image forming apparatus 1 when speech operation is accepted.

Further, when a job is accepted by job accepting unit 1601 while speech is being accepted by speech accepting unit 1801, comparison unit 1012 may read from storage unit 1021 the plurality of noise levels produced by the plurality of devices operated in this job, and compare the read noise levels with the predetermined preference threshold value. When the job includes operation of a device producing a noise level higher than the preference threshold value based on a result of the comparison by comparison unit 1012, control unit 1013 preferentially performs the acceptance of speech by speech accepting unit 1801, and suspends the execution of the job accepted by job accepting unit 1601. Accordingly, image forming apparatus 1 according to the first embodiment can compare the preference threshold value with the noise levels read from storage unit 1021, without detecting the speech level accepted by speech accepting unit 1801, thereby simplifying the process of comparing the speech level and the noise levels.

In the execution of the job accepted by job accepting unit 1601, control unit 1013 may suspend only the operation of a device producing a noise level higher than the preference threshold value. Accordingly, when suspending the job so as to give higher priority to the speech operation process, image forming apparatus 1 according to the first embodiment can suspend only the operation of a device producing a noise level higher than the preference threshold value, without having to suspend the entire job. That is, image forming apparatus 1 can simultaneously perform the operation of a device not producing a noise level exceeding the preference threshold value and the speech operation process, thereby improving processing efficiency.

Further, when speech is accepted by speech accepting unit 1801 while a job accepted by job accepting unit 1601 is being executed, comparison unit 1012 may compare the predetermined permission threshold value based on which the acceptance of speech by speech accepting unit 1801 is permitted with the total value calculated by comparison unit 1012. When the total value is higher than the permission threshold value based on a result of the comparison by comparison unit 1012, control unit 1013 suspends the acceptance of speech by speech accepting unit 1801. Accordingly, image forming apparatus 1 according to the first embodiment can compare the permission threshold value with the noise level produced by the previously accepted job, without detecting the speech level accepted by speech accepting unit 1801, thereby simplifying the process of comparing the speech level and the noise level.

Control unit 1013 may reduce the operation of the plurality of devices as compared to during normal operation, to perform switching to the silent mode in which the noise level is lower than that of the normal operation. When a job is accepted by job accepting unit 1601 while speech is being accepted by speech accepting unit 1801, comparison unit 1012 compares the predetermined permission threshold value based on which the acceptance of speech by speech accepting unit 1801 is permitted with the total value calculated by comparison unit 1012. When the total value is higher than the permission threshold value based on a result of the comparison by comparison unit 1012, control unit 1013 switches the operation of the plurality of devices to the silent mode. When the total value calculated by comparison unit 1012 after the switching to the silent mode is higher than the permission threshold value, control unit 1013 suspends the execution of the job accepted by job accepting unit 1601. Accordingly, image forming apparatus 1 according to the first embodiment can reduce the noise levels produced by the devices by performing the switching to the silent mode without suspending the job, thereby improving processing efficiency.

Second Embodiment

In image forming apparatus 1 according to the first embodiment, storage unit 1021 has been described as storing the noise levels produced by the plurality of devices constituting image forming apparatus 1. Thus, according to the description of the first embodiment, when comparison unit 1012 determines a noise level produced by a job executed in image forming apparatus 1, a total value having a maximum volume is calculated based on the assumption that the plurality of devices operate simultaneously.

When the job is executed and the plurality of devices operate, however, not all of the operating devices are started simultaneously or stopped simultaneously. In an image forming apparatus according to a second embodiment, therefore, the storage unit stores not only the noise levels produced by the plurality of devices constituting the image forming apparatus, but also time information on the production of those noise levels. The image forming apparatus according to the second embodiment has the same configuration as image forming apparatus 1 according to the first embodiment shown in FIGS. 1 to 3, and is therefore designated by the same characters and detailed description thereof will not be repeated.

First, an example is described where the noise levels produced by the plurality of devices are the only information stored in storage unit 1021. When image forming apparatus 1 performs a job process of copying a single document using scanner 2, for example, this job process causes operation of the image reader, the engine and the finisher. Referring to FIG. 5, these devices have noise levels of "2", "4" and "3", respectively, and therefore, a noise level produced by the job is a simple sum of these noise levels, i.e., "9".

In this job process, however, the operation of the image reader for scanning a document set on scanner 2, the operation of the engine for copying the document, and the operation of the finisher for ejecting a copied sheet of paper are not started simultaneously or stopped simultaneously. That is, in this job process, the operation of the image reader for scanning the document set on scanner 2 is started, and after a period of time has passed, the operation of the engine for copying the document is started. Then, in this job process, the operation of the engine is started, and after a period of time has passed, the operation of the finisher for ejecting the copied sheet of paper is started.

Figure 7:
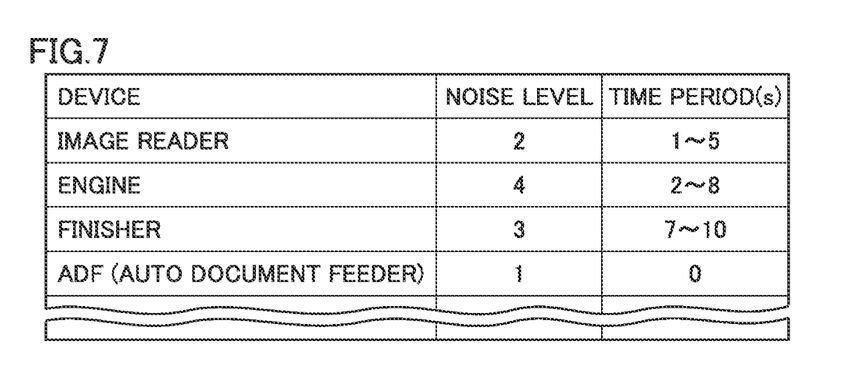
FIG. 7 is a schematic diagram of data stored in the storage unit according to a second embodiment.

In this manner, a time of operation is predetermined for each of the plurality of devices operated by the job process. In image forming apparatus 1 according to the second embodiment, therefore, time information on the operation of each device producing noise is also prestored in storage unit 1021. FIG. 7 is a schematic diagram of data stored in storage unit 1021 according to the second embodiment. The schematic diagram of FIG. 7 shows a predetermined time period (time information) of operation of each device in the job process of copying a single document using scanner 2 illustrated above. The table of FIG. 7 is different from the table of FIG. 4 in that it includes the time information indicating the time periods (in seconds (S)) of operation of the devices.

Specifically, the table of FIG. 7 illustrates the time periods with respect to the time of acceptance of a job process by image forming apparatus 1, which is indicated as zero second, and indicates that the image reader operates for a time period between one and five seconds after the acceptance of the job process. The table of FIG. 7 also indicates that the engine operates for a time period between a lapse of two seconds and a lapse of eight seconds after the acceptance of the job process, and the finisher operates for a time period between a lapse of seven seconds and a lapse of ten seconds after the acceptance of the job process. Since this job process is to copy a single document using scanner 2, the ADF does not operate, and the table of FIG. 7 indicates a time period of operation of the ADF as zero.

Figure 8:
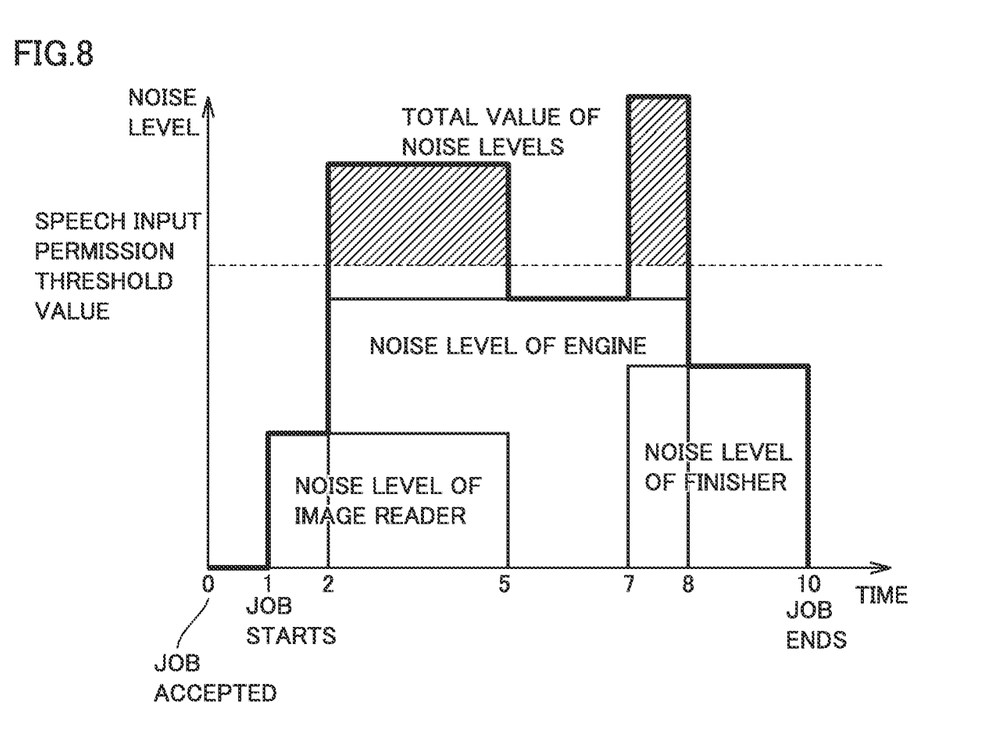
FIG. 8 shows a method of calculating a total value of noise levels according to the second embodiment.

A method of calculating a total value of noise levels from the time periods of operation of the devices shown in FIG. 7 is described. FIG. 8 shows a method of calculating a total value of noise levels according to the second embodiment. The time periods of operation of the respective devices shown in FIG. 8 are based on the illustration shown in FIG. 7. In FIG. 8, the vertical axis represents the noise level and the horizontal axis indicates time. The image reader starts operating upon lapse of one second after the acceptance of the job process. The engine starts operating upon lapse of two seconds after the acceptance of the job process. Since the image reader and the engine are devices operating at this point in time, a total value of the noise levels of these two devices is a noise level produced by the job at this point in time. In other words, as the image reader has a noise level of "2" and the engine has a noise level of "4", the noise level produced by the job upon lapse of two seconds after the acceptance of the job process is the sum of these noise levels, i.e., "6".

Then, the noise level produced by the job continues to have the total value of "6" until a lapse of five seconds after the acceptance of the job process at which the image reader stops. Between a lapse of five seconds after the acceptance of the job process and a lapse of seven seconds after the acceptance of the job process at which the finisher starts operating, the engine is the only operating device. That is, the noise level produced by the job during this time period is the noise level "4" produced by the engine. Then, the finisher starts operating, causing the noise level produced by the job to be a total value of "7" of the noise level of "4" of the engine and the noise level of "3" of the finisher. Then, upon lapse of eight seconds after the acceptance of the job process, the engine stops and only the finisher operates. Lastly, upon lapse of ten seconds after the acceptance of the job process, the finisher stops operating and the job process ends.

A speech input permission threshold value is set on the vertical axis shown in FIG. 8. This speech input permission threshold value is the permission threshold value described in the first embodiment, and is hereinafter referred to simply as the permission threshold value. The permission threshold value is set to a noise level "5" in the second embodiment. Accordingly, a time period during which a noise level exceeding the permission threshold value "5" is produced corresponds to both a time period between a lapse of two seconds and a lapse of five seconds, and a time period between a lapse of seven seconds and a lapse of eight seconds, after the job acceptance. Using the flowchart of FIG. 6 described in the first embodiment, the job is executed in the silent mode during both time periods (step S14). Thus, image forming apparatus 1 can execute the job in the normal mode during time periods of the job process other than both time periods, thereby improving efficiency of the job process.

In contrast, in the first embodiment, the noise level produced by the job is a simple sum of the noise levels produced by the image reader, the engine and the finisher, i.e., "9". Thus, the noise level exceeds the permission threshold value during the entire time period of the job process. As a result, image forming apparatus 1 executes the job by performing switching to the silent mode during the entire time period of the job process, resulting in reduced operation as compared to during the normal mode. Therefore, the job is executed in the silent mode even during time periods over which the noise level does not exceed the permission threshold value in FIG. 8, resulting in reduced efficiency of the job process.

Although comparison unit 1012 has been described in the above illustration as comparing the noise level produced by the job that has been calculated based on the time period of operation with the permission threshold value, comparison unit 1012 is not limited as such, and may compare the noise level with the speech level detected by detection unit 1011, the preference threshold value and the like.

<Conclusion of This Section>

In image forming apparatus 1 according to the second embodiment, storage unit 1021 stores the start time and the end time (time period of operation) of the noise level produced by each of the plurality of devices by the execution of a job. Based on the start time and the end time stored in storage unit 1021, comparison unit 1012 calculates, at each point of time, a total value of the noise levels produced by the plurality of devices by the execution of a job. When a job is accepted by job accepting unit 1601 while speech is being accepted by speech accepting unit 1801, comparison unit 1012 compares the permission threshold value with the total value at each point of time, and when the total value is higher than the permission threshold value based on a result of the comparison by comparison unit 1012, control unit 1013 switches the operation of the plurality of devices to the silent mode. When the total value calculated by comparison unit 1012 after the switching to the silent mode is higher than the permission threshold value, control unit 1013 suspends the execution of the job accepted by job accepting unit 1601.

Accordingly, image forming apparatus 1 according to the second embodiment can compare the permission threshold value with the noise level calculated based on the start time and the end time, and control which one of the process of accepting the speech instruction and the process of executing the job in image forming apparatus 1 should be preferentially performed, to optimize processing performed in the image forming apparatus when speech operation is accepted, thereby improving user convenience.

[Variations]

(1) Although the preference threshold value has been described as being set to be higher than the permission threshold value in the first embodiment, the image forming apparatus may be configured such that a single threshold value is compared with the noise level produced by the job. Conversely, the image forming apparatus may be configured such that three or more threshold values are provided to allow a different process to be performed for each threshold value.

(2) Although the table of FIG. 7 shows the start time and the end time (time period of operation) of each noise level when executing the job process of copying a single document using scanner 2, each noise level as well as the start time and the end time of the noise level are similarly indicated for each device for different job processes as well. The information stored in storage unit 1021 is not limited to the forms such as shown in FIGS. 4 and 7. Any form can be used as long as the noise levels produced by the plurality of devices constituting image forming apparatus 1 during operation of the devices can be stored and read correspondingly to a job executed in image forming apparatus 1.

Although embodiments of the present invention have been described and illustrated in detail, the disclosed embodiments are made for purposes of illustration and example only and not limitation. The scope of the present invention should be interpreted by terms of the appended claims

What is claimed is:

1. An image forming apparatus comprising:
a controller that controls the image forming apparatus;
a memory that stores noise levels produced by a plurality of devices constituting the image forming apparatus during operation of the devices; and
a microphone that accepts a speech instruction for the image forming apparatus,
the controller:
accepting a job,
detecting a speech level from the speech accepted by the microphone,
determining a noise level that corresponds to the job to be executed based on the stored noise levels of one or more devices, of the plurality of devices, to be used to execute the job,
comparing the detected speech level with the noise level that corresponds to the job to be executed in the image forming apparatus and that has been read from the memory, and
controlling, based on a result of the comparison, which one of a process of accepting the speech instruction and a process of executing the job in the image forming apparatus should be preferentially performed.

2. The image forming apparatus according to claim 1, wherein
the comparing the detected speech level with a noise level that corresponds to the job to be executed in the image forming apparatus and that has been read from the memory includes
calculating a total value of the plurality of noise levels produced by the plurality of devices operated in a job executed based on a prescribed setting, and
comparing the detected speech level with the calculated total value.

3. The image forming apparatus according to claim 2, wherein
when speech is accepted by the microphone while the accepted job is being executed, the controller compares a predetermined permission threshold value based on which acceptance of the speech by the microphone is permitted with the calculated total value, and when the total value is higher than the permission threshold value based on a result of the comparison, the controller suspends acceptance of the speech by the microphone.

4. The image forming apparatus according to claim 2, wherein
the controller reduces operation of the plurality of devices as compared to during normal operation, to perform switching to silent operation in which a noise level is lower than that of the normal operation,
when a job is accepted while speech is being accepted by the microphone, the controller compares a predetermined permission threshold value based on which acceptance of the speech by the microphone is permitted with the calculated total value, and when the total value is higher than the permission threshold value based on a result of the comparison, the controller switches the operation of the plurality of devices to the silent operation, and
when the total value calculated after the switching to the silent operation is higher than the permission threshold value, the controller suspends execution of the accepted job.

5. The image forming apparatus according to claim 4, wherein
the memory stores a start time and an end time of the noise level produced by each of the plurality of devices by execution of a job, and
based on the start time and the end time stored in the memory, the controller calculates, at each point of time, the total value of the noise levels produced by the plurality of devices by execution of a job, and when a job is accepted while speech is being accepted by the microphone, the controller compares the permission threshold value with the total value at each point of time, and when the total value is higher than the permission threshold value based on a result of the comparison, the controller switches the operation of the plurality of devices to the silent operation, and when the total value calculated after the switching to the silent operation is higher than the permission threshold value, the controller suspends execution of the accepted job.

6. The image forming apparatus according to claim 1, wherein
when a job is accepted while speech is being accepted by the microphone, the controller reads from the memory the plurality of noise levels produced by the plurality of devices operated in the job, and compares the read noise levels with a predetermined preference threshold value, and
when the job includes operation of a device producing a noise level higher than the preference threshold value based on a result of the comparison, the controller preferentially performs acceptance of the speech by the microphone, and suspends execution of the accepted job.

7. The image forming apparatus according to claim 6, wherein
in execution of the accepted job, the controller suspends only the operation of a device producing a noise level higher than the preference threshold value.

* * * * *